| United States Patent [19] | [11] Patent Number: 4,804,580 |
| Singelyn | [45] Date of Patent: Feb. 14, 1989 |

[54] CATALYTIC REFORMER HOUSING INSULATION AND METHOD OF MAKING SAME

[75] Inventor: James D. Singelyn, Newington, Conn.

[73] Assignee: International Fuel Cells Corporation, South Windsor, Conn.

[21] Appl. No.: 215,975

[22] Filed: Jul. 7, 1988

[51] Int. Cl.$^4$ .............................. B32B 5/16; B05D 7/22
[52] U.S. Cl. ............................... 428/312.2; 428/312.6; 428/313.3; 428/313.9; 428/319.1; 428/325; 428/406; 427/181; 427/421
[58] Field of Search ............... 428/312.2, 312.6, 313.3, 428/313.9, 319.1, 325, 406; 427/181, 121

[56] References Cited

U.S. PATENT DOCUMENTS 4,223,067  9/1980  Levens .............................. 428/313.9

Primary Examiner—William J. Van Balen
Attorney, Agent, or Firm—William W. Jones

[57] ABSTRACT

A non-combustible, inorganic heat insulation which can be sprayed onto a surface being insulated is particularly useful for forming the cold face insulation layer in a catalytic reformer housing. The insulation is formed from an inorganic cement having glass and/or ceramic microspheres mixed therein.

6 Claims, No Drawings

CATALYTIC REFORMER HOUSING INSULATION AND METHOD OF MAKING SAME

DESCRIPTION

1. Technical Field

This invention relates to an insulation material operable to provide heat insulation for the interior of a high temperature catalytic reformer housing used in a fuel cell power plant, or other similar housing.

2. Background Art

In a catalytic reformer in a fuel cell power plant where anode exhaust gases containing a high percentage of hydrogen and $CO_2$ are burned under pressure, the resulting fuel gases will have a very high dew point reaching values as high as 250° F. Since such reformers are internally insulated, it is necessary to provide an outermost layer of insulation, called the cold face insulation, that prevents condensation on and corrosion of the reformer vessel wall, and deterioration of the adjoining insulation material. This cold face insulation layer is presently being formed from glass foam blocks which are cut to size and glued onto the inside surface of the reformer vessel. The foam glass does provide the required imperviousness to $CO_2$ and water vapor, and also provide a K factor which is low enough to result in a temperature on the hot side of the cold face insulation which is above the dew point during normal operating conditions. One problem which occurs with the glass foam panel approach is that the mastic adhesive used to hold the glass foam panels on the vessel will degrade and decompose at temperatures above about 300° F. When this occurs, the glass foam panels can detach or separate from the vessel walls. Another problem with the glass foam panels relates to the time and expense needed to install them in the reformer vessel. They must be manually cut and installed one at a time and carefully glued into place.

DISCLOSURE OF INVENTION

This invention relates to an improved thermal cold face insulation for a catalytic reformer vessel which can be applied to the inside surface of the reformer vessel by spraying with a spray gun. The insulation is formed from a two-phase powder precursor and liquid/powder mixture precursor which are co-mingled in the spray nozzle and sprayed onto the vessel wall. The powder precursor is a mixture of an inorganic cement component and a precursor glass or ceramic microsphere component. The liquid precursor is a mixture of the cement and water. The resulting insulation is continuous, has a K factor which is below 1.0, is non-combustible, and is easily applied. The spray shows good adhesion to the sand blasted carbon steel surface of the vessel wall, which has been precoated with a high temperature silicon corrosion inhibitor. After the insulation layer has been initially cured, a top coating of potassium silicate is applied to it to seal its inherently open cell surface.

The powder precursor of the insulation contains from about 30% to about 40%, and preferably about 35% by weight glass and/or ceramic microspheres. Glass spheres sold under the trademark "Eccosphere 1G" by Emerson Cummings Division of W. R. Grace and Co., and ceramic spheres sold by the same entity under the trademark "Eccosphere FAB" have been used, and have proven to be acceptable for use in this invention. The remainder of the dry precursor is an inorganic cement, such as Sauereisen No. 34, sold by the Sauereisen Corporation of Pittsburgh, Pa. The wet precursor of the insulation contains Sauereisen No. 34 inorganic cement, in the range of about 60% to about 85%, and preferably about 73%, by weight, with the remainder being water. The cured insulation formed on the reformer housing wall will thus constitute from about 20% to about 40% and preferably about 30% by weight glass and/or ceramic microspheres, with the remainder being the inorganic cement. As previously noted, after being sprayed onto the reformer housing wall, the exposed surface of the insulation will preferably be sealed with a potassium silicate, or equivalent, coating after the insulation has been initially cured.

It will be readily appreciated that the insulation can be easily and quickly applied to the reformer wall as it is sprayable or gunnable. Adhesion is good to either a carbon steel surface or to a silicon primed carbon steel surface. The density of the resultant insulation is about 38 pcf when dry. A thickness of about 2.5 inches has been found to be operable in reformers having operating temperatures as high as 1200° F. While this invention has been disclosed in connection with fuel cell power plant reformer vessels, it will be appreciated that any pressurized vessel which operates at high temperatures, and contains moist gases wherein water could condense out at operating temperatures or on shut down will benefit from use of the interior cold face insulation of this invention.

Since many changes and variations of the disclosed embodiments of the invention may be made without departing from the inventive concept, it is intended to limit the invention otherwise than as required by the appended claims.

I claim:

1. A cold face insulation layer for the inside surface of a pressurized vessel, which vessel operates at high temperatures and contains moist gases, which insulation will prevent moisture from condensing on interior surfaces of the vessel, said insulation, when cured, comprising a mixture of about 20% to about 40% by weight of glass or ceramic microspheres with the balance being an inorganic cement.

2. The insulation layer of claim 1 having an exposed surface thereof which is sealed with a coating of potassium silicate.

3. The insulation layer of claim 1 comprising about 30% by weight of said microsphere.

4. A method of insulating the inside surface of a pressurized high temperature vessel, said method comprising the steps of:
   (a) providing a wet precursor comprising from about 60% to about 85% by weight of an inorganic cement, with the balance being water;
   (b) providing a dry precursor comprising from about 30% to about 40% by weight of glass or ceramic microspheres, with the balance being an inorganic cement;
   (c) mixing and spraying said wet and dry precursors onto the inside surface of said vessel to form an insulation layer thereon; and
   (d) curing the insulation layer in situ on the surface of the vessel.

5. The method of claim 4 including the further step of sealing all exposed surfaces of said insulation layer with a cell-closing sealant.

6. The method of claim 5 further comprising a preliminary step of precoating the inside surface of the vessel with a corrosion inhibitor prior to performing said spraying step.

* * * * *